(12) United States Patent
Battistella et al.

(10) Patent No.: US 11,646,628 B2
(45) Date of Patent: May 9, 2023

(54) MOTORIZED WHEEL STRUCTURE

(71) Applicant: AMER S.P.A., Valdagno (IT)

(72) Inventors: Francesco Battistella, Valdagno (IT); Mirko Dalla Costa, Schio (IT)

(73) Assignee: AMER S.P.A., Valdagno (IT)

( * ) Notice: Subject to any disclaimer, the term of this patent is extended or adjusted under 35 U.S.C. 154(b) by 358 days.

(21) Appl. No.: 17/022,218

(22) Filed: Sep. 16, 2020

(65) Prior Publication Data

US 2021/0099049 A1 Apr. 1, 2021

(30) Foreign Application Priority Data

Sep. 26, 2019 (IT) .................. 102019000017300

(51) Int. Cl.
| | |
|---|---|
| *H02K 5/26* | (2006.01) |
| *B60K 7/00* | (2006.01) |
| *H02K 7/00* | (2006.01) |
| *H02K 7/08* | (2006.01) |
| *H02K 7/116* | (2006.01) |
| *H02K 15/14* | (2006.01) |

(52) U.S. Cl.
CPC .............. *H02K 5/26* (2013.01); *B60K 7/0007* (2013.01); *H02K 7/006* (2013.01); *H02K 7/083* (2013.01); *H02K 7/116* (2013.01); *H02K 15/14* (2013.01)

(58) Field of Classification Search
CPC ......... H02K 5/26; H02K 15/14; B60K 7/0007
See application file for complete search history.

(56) References Cited

U.S. PATENT DOCUMENTS

| | | | |
|---|---|---|---|
| 2008/0224553 A1* | 9/2008 | Abe ...................... | H02K 7/116 310/71 |
| 2009/0236157 A1 | 9/2009 | Akamatsu | |
| 2012/0318601 A1* | 12/2012 | Kuroki .................. | B62M 23/02 903/902 |
| 2013/0217529 A1 | 8/2013 | Gunji et al. | |
| 2015/0357873 A1 | 12/2015 | Battistella et al. | |
| 2019/0084408 A1* | 3/2019 | Mizuike ................. | H02K 7/116 |
| 2019/0232747 A1* | 8/2019 | Tamura ................. | F16H 57/021 |

(Continued)

FOREIGN PATENT DOCUMENTS

| | | |
|---|---|---|
| EP | 2 955 049 A1 | 12/2015 |
| EP | 3 521 088 A1 | 8/2019 |

OTHER PUBLICATIONS

Search Report dated Jul. 1, 2020, issued in Italian Application No. 201900017300.

*Primary Examiner* — Brian L Swenson
(74) *Attorney, Agent, or Firm* — Workman Nydegger

(57) ABSTRACT

Motorized wheel structure includes a motor unit equipped with a stator case, a motor reduction unit operatively connected to the motor unit, and a fixing bracket for fastening the motorized wheel structure to an external device. The motorized wheel structure envisages that the motor reduction unit is equipped at one own end with a substantially circular coupling seat in which a first coupling area and a second coupling area are defined, the fixing bracket is equipped with an annular portion removably coupled in correspondence with the first coupling area of the coupling seat and the stator case is installed passing through the annular portion of the fixing bracket and is removably coupled in correspondence with the second coupling area of the coupling seat.

9 Claims, 8 Drawing Sheets

(56) References Cited

U.S. PATENT DOCUMENTS

2020/0039308 A1* 2/2020 Tamura ................ B60K 17/043
2020/0130498 A1* 4/2020 Matsushima ........ B60K 17/043
2020/0207405 A1* 7/2020 Kuribayashi .......... B60K 11/06

* cited by examiner

MOTORIZED WHEEL STRUCTURE

CROSS-REFERENCE TO RELATED APPLICATIONS

This application claims priority to Italian Application No. 102019000017300, filed Sep. 26, 2019, which is incorporated herein by specific reference.

BACKGROUND OF THE INVENTION

1. The Field of the Invention

The present invention relates to an improved motorized wheel structure.

The invention also relates to the method of fixing the components that make up the aforementioned motorized wheel structure.

2. The Relevant Technology

For simplicity, from this point forward and unless otherwise indicated, the term "motorized wheel" will be used to indicate the aforementioned motorized wheel structure of the invention.

It is known that machines such as floor scrubbing machines, industrial sweepers, and electric trucks for transporting loads are equipped with one or more motorized wheels to move them.

Essentially, each motorized wheel comprises a motor unit comprising an electric motor, such as for example a direct-current electric motor, supported by a fixing bracket, for fixing the motorized wheel to the structure of a truck or of a scrubbing machine. Even more precisely, this electric motor unit is suited to rotate a wheel by way of a motor reduction unit.

As far as the electric motor unit is concerned, as per the prior art, it substantially comprises a cap fastened to a stator case, where there are housed a stator, which may be made of permanent magnets or windings, and a rotor inside the stator case which is suited to rotate with respect to said stator.

A first type of motorized wheels in the prior art comprises the stator case secured to an annular portion of the fixing bracket by means of the aforementioned cap and threaded elements.

In addition, the motor reduction unit is fixed on the opposite side of the aforementioned annular portion of the fixing bracket.

This first embodiment of the prior art has some well known drawbacks.

First of all, the activities related to the production of the specific cap and the fastening thereof to the fixing bracket with screws generate significant costs, both in terms of components used and assembly times, as well as labour costs involved.

Furthermore, the fact of coupling the motor reduction unit and the motor unit to each other using the annular portion of the fixing bracket disadvantageously reduces the precision of the coupling and assembly which in turn leads to an increase in noise and an increased risk of wear and tear on the motor reduction unit components.

To overcome these drawbacks, a second embodiment in the prior art, described in EP2955049, provides for a motorized wheel comprising a motor unit, a motor reduction unit, and a fixing bracket, wherein, unlike the previous embodiment, the stator case is coupled to the fixing bracket by inserting the former in an annular portion defined on the fixing bracket itself which has a corresponding internal contour. In particular, they are coupled by means of interference.

The motor reduction unit is then directly coupled to the motor unit through suitable fixing means.

In this way, advantageously, the motor shaft bearing is directly coupled to the motor reduction unit, therefore increasing the precision of the coupling between those two components with respect to the aforementioned embodiment of the prior art.

However, fastening by means of interference of the fixing bracket to the stator case disadvantageously causes a deformation of the external surface of the fixing bracket itself, where the bearing needed for the rotation of the wheel must subsequently be coupled.

Therefore, for this reason, according to this embodiment it is necessary, as a result of the aforementioned coupling by interference, to grind the relevant surface.

First of all, disadvantageously, this grinding adds an additional operation to the assembly operation, with a consequent increase in time and costs involved in the production of the motorized wheel.

In addition, if the electric motor involved is brushless and thus equipped with a stator made of windings, this grinding could disadvantageously damage the same windings.

SUMMARY OF THE INVENTION

The present invention aims to overcome the aforementioned drawbacks of the prior art.

In particular, it is an object of the invention to provide a motorized wheel able to couple the motor reduction unit to the motor with the utmost precision.

Consequently, it is an object of the invention to provide a motorized wheel with reduced noise.

Furthermore, it is an object of the invention to provide a motorized wheel which minimizes the wear on its components, in particular the motor reduction unit components.

Another object of the invention is to provide a motorized wheel which requires a reduced number of processes with respect to the processes required by the motorized wheels of the prior art.

Still another object of the present invention is to provide a motorized wheel which does not need processes that could lead to the damage of the most delicate parts of the motorized wheel itself.

Said objects are achieved with the production of a motorized wheel in accordance with the main claim to which reference will be made.

Further characteristics of the motorized wheel of the invention are described in the dependent claims.

The method for assembling and fixing the components of the motorized wheel of the invention, according to claim 7, is also part of the invention.

BRIEF DESCRIPTION OF THE DRAWINGS

The aforesaid objects, together with the advantages that will be addressed below, will be highlighted during the description of some preferred embodiments of the invention by way of non-limiting examples, with reference to the attached drawings, where.

DETAILED DESCRIPTION OF THE PREFERRED EMBODIMENTS

The motorized wheel of the invention, according to a preferred embodiment, is shown in FIGS. 1 to 4b, where it is indicated as a whole with the number 1.

Figure 4A:
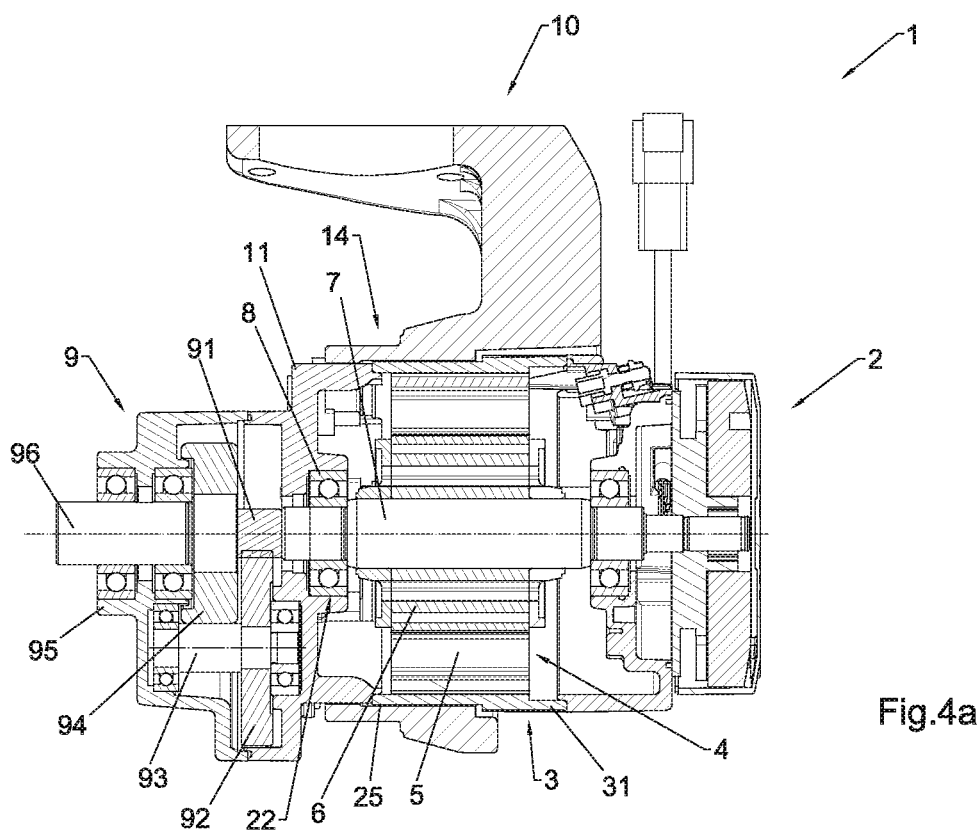
FIG. 4a shows a sectional side view along a vertical section plane, of the motorized wheel of FIG. 2.

Said motorized wheel 1 comprises a motor unit 2 in turn equipped with a stator case 3, preferably defined by a cylinder made of metal material 31. Inside this stator case 3, as shown in FIG. 4a, the motor unit 2 comprises the actual electric motor 4, equipped with a stator 5 and a rotor 6 equipped with a motor shaft 7 coupled to one end of which there is a rotation bearing 8, the usefulness of which will be described below.

According to the preferred embodiment of the invention, the electric motor 4 is a brushless electric motor, therefore comprising a stator 5 made up of a plurality of windings and a rotor 6 made up of permanent magnets.

However, according to different embodiments of the invention the electric motor 2 may be a different type than brushless, in particular this electric motor could have a permanent magnet stator.

Figure 1:
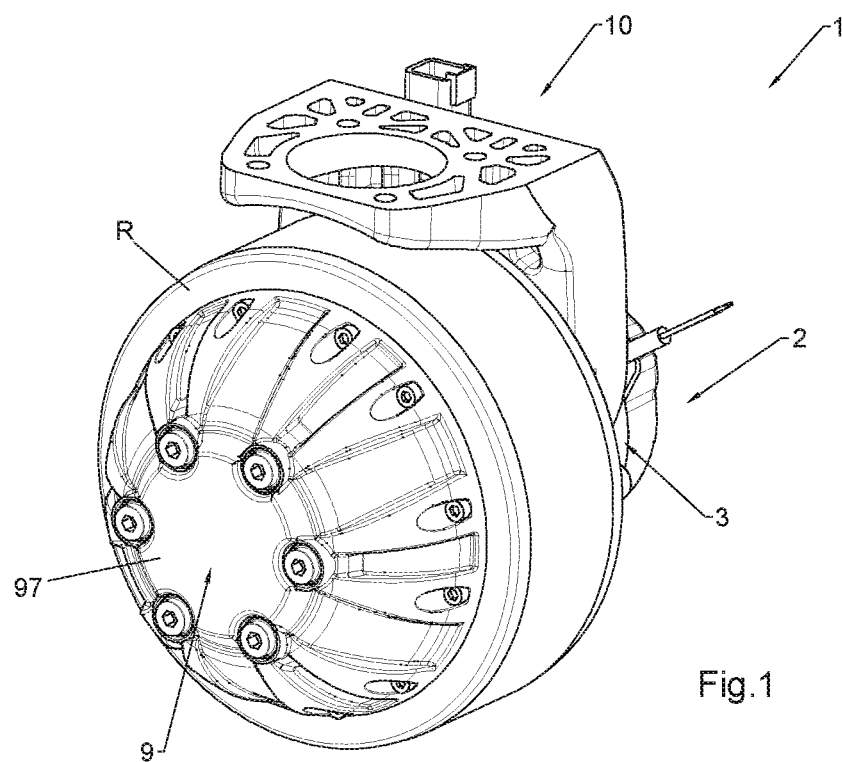
FIG. 1 shows an axonometric view of the motorized wheel structure of the invention including the wheel.
Figure 2:
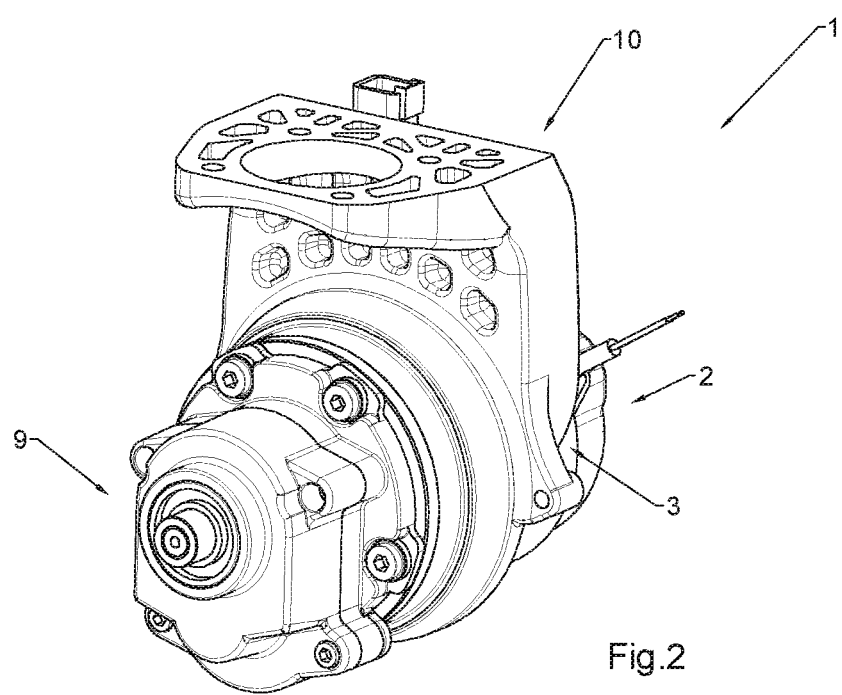
FIG. 2 shows an axonometric view of the motorized wheel structure of the invention without the wheel.
Figure 3:
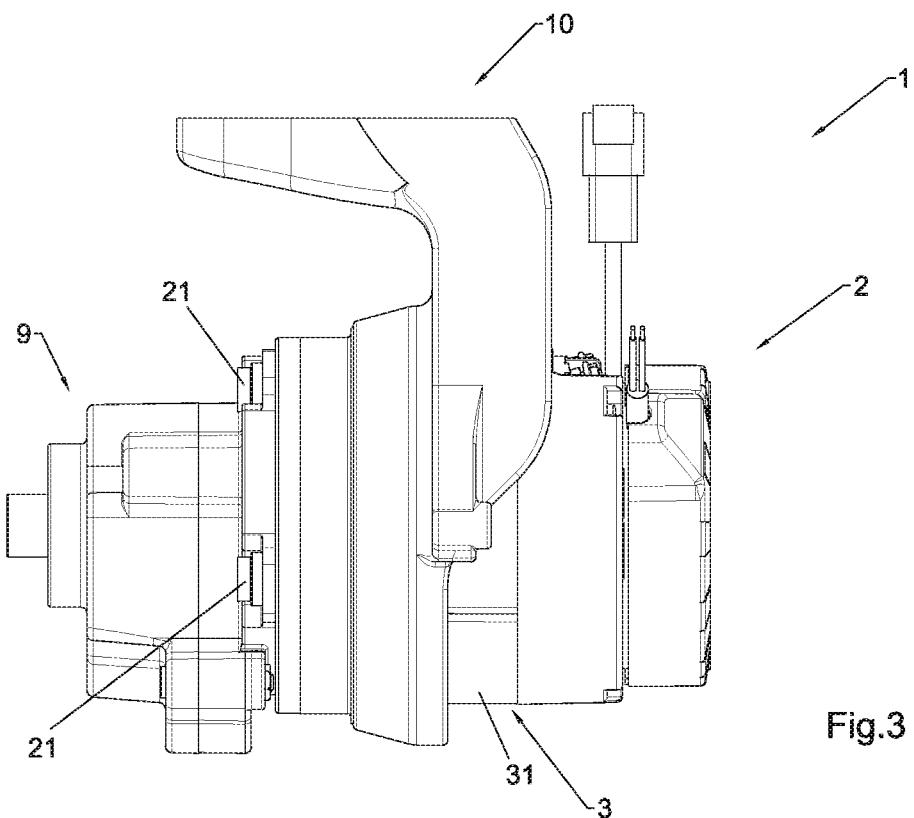
FIG. 3 shows a side view of the motorized wheel of FIG. 2.

Clearly, given that the object of the invention is a motorized wheel 1, the motor unit 2 is configured to rotate a wheel R, shown in FIG. 1.

In this regard, according to the invention, this wheel is rotated by the aforementioned motor unit 2 by means of the interposition of a motor reduction unit 9 which is suited to reduce the rotation speed generated by the electric motor 4 and, consequently, increase the torque transmitted to the wheel itself.

Figure 4B:
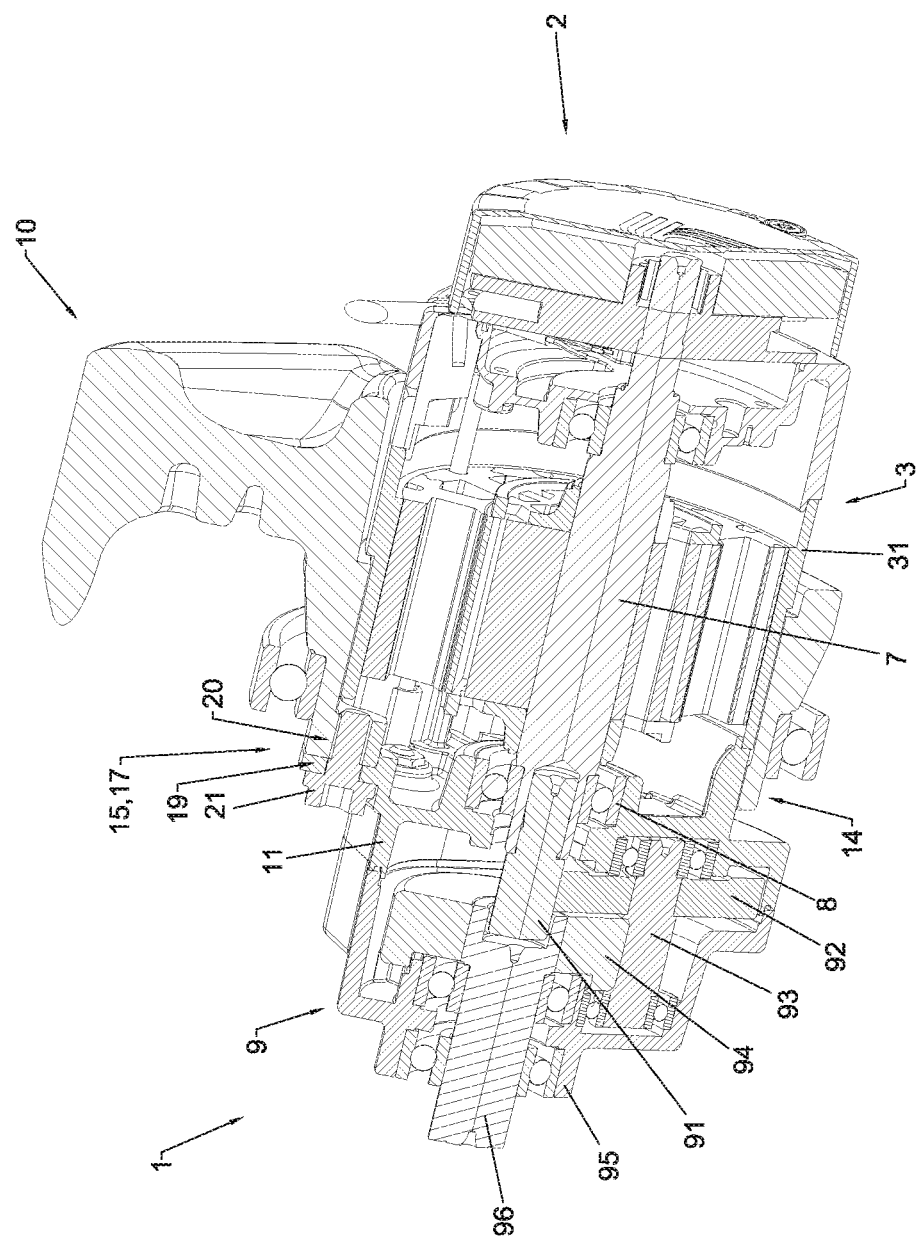
FIG. 4b shows an axonometric sectional view of the motorized wheel of FIG. 2 according to two section planes intersecting each other and parallel to the axis of the electric motor.

In particular, as can be seen in FIGS. 4a and 4b, this motor reduction unit 9 is operatively connected to the motor shaft 7 of the motor unit 2.

Structurally, preferably but not necessarily, the preferred embodiment of the invention provides that this motor reduction unit 9 comprises a first pinion 91 fastened to the end of the shaft 7 of the electric motor 4, a first reduction gear 92, with its axis parallel to the axis of the electric motor 4, which in turn is coaxially equipped with a second pinion 93 that engages a second reduction gear 94 coaxial with respect to the motor shaft 7 of the electric motor 4.

This second reduction gear 94 is supported by a casing 95 protecting the motor reduction unit 9.

The rotation shaft 96 of the second reduction gear 94 has a wheel-holder flange not shown in the figures, with the external cap 97 visible in FIG. 1 connected to it, which is in turn integral with the wheel for transmitting the rotation to the latter.

However, in alternative embodiments of the invention, with respect to the preferred one just described, the motor reduction unit 9 may comprise a number of reduction gears greater than two.

As noted, the rotatable coupling of the motor shaft 7 with the motor reduction unit 9 takes place by means of the aforementioned rotation bearing 8.

Furthermore, the motorized wheel 1 of the invention comprises a fixing bracket 10 for fastening the motorized wheel 1 to an external device, such as for example floor scrubbing machines, industrial sweepers, and electric trucks for transporting loads.

Figure 5:
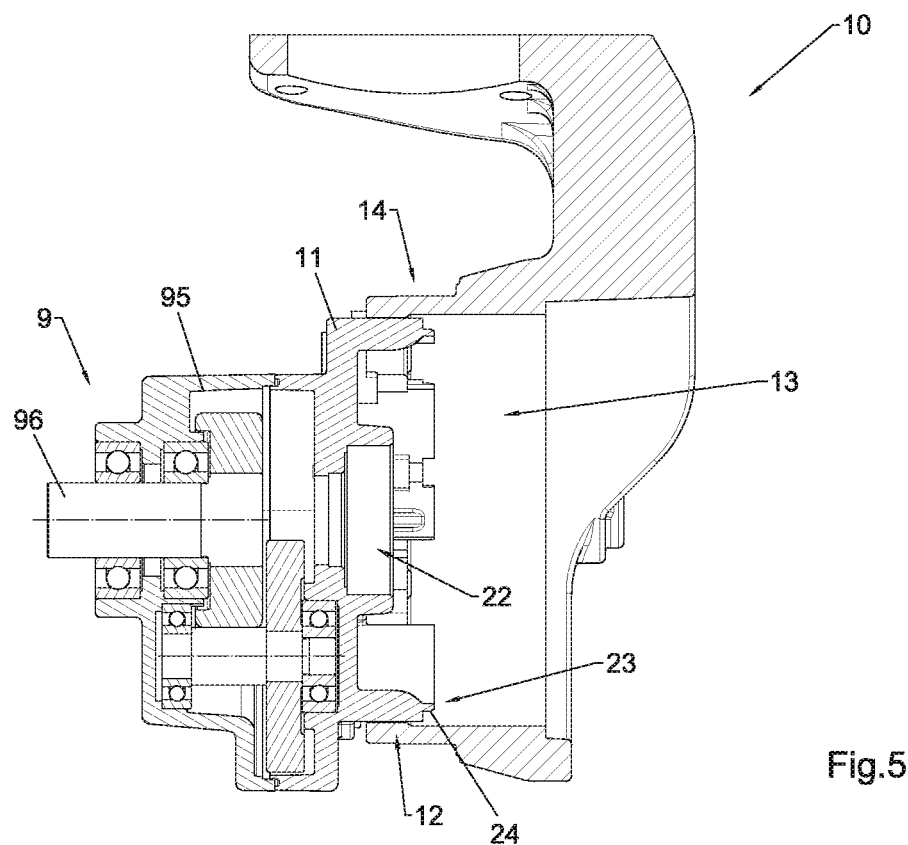
FIG. 5 shows a sectional side view along a vertical section plane, of the motor reduction unit coupled to the fixing bracket of the motorized wheel of FIG. 2 without the motor unit.
Figure 6:
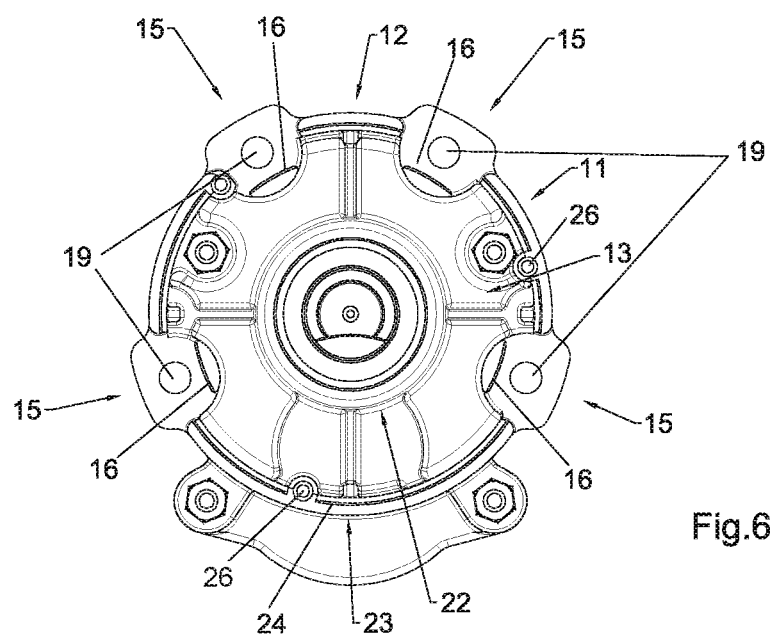
FIG. 6 shows a rear view of the motor reduction unit of the motorized wheel of FIG. 2 without the motor unit.
Figure 7:
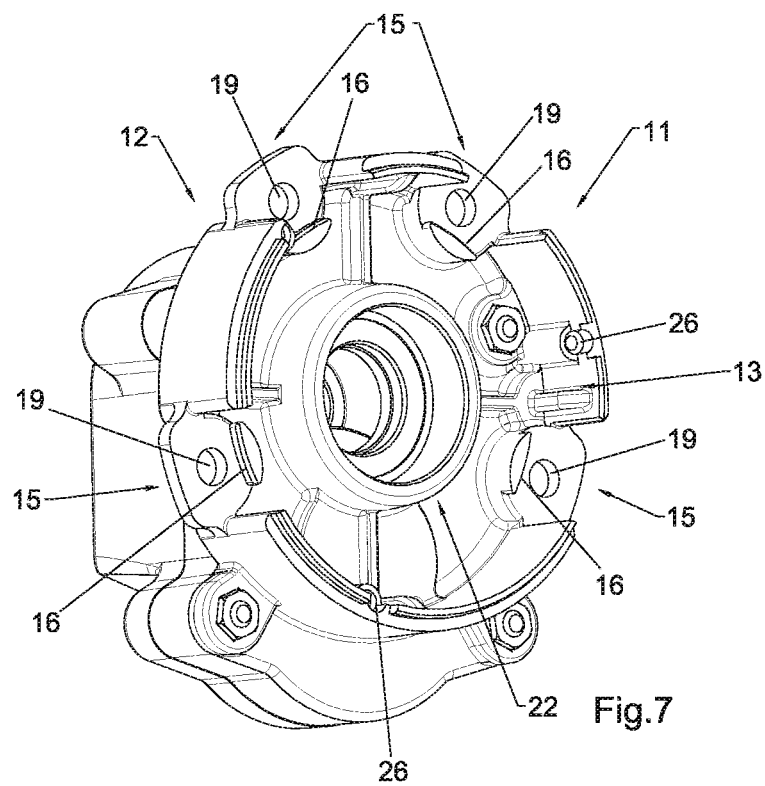
FIG. 7 shows a rear axonometric view of the motor reduction unit of the motorized wheel of FIG. 2.
Figure 8:
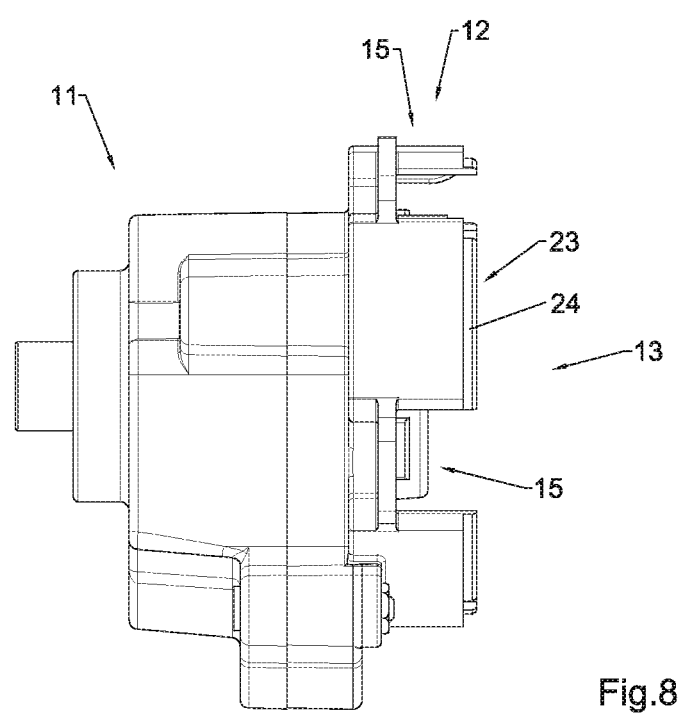
FIG. 8 shows a side view of the motor reduction unit of the motorized wheel of FIG. 2 without the motor unit and the fixing bracket.

According to the invention, as seen in FIGS. 4a, 4b and 5, the casing 95 of the motor reduction unit 9 is equipped, in correspondence with its end opposite the end where the aforesaid outer cap 97 is fastened, with a coupling seat 11 having an essentially circular shape.

In this coupling seat 11, in particular, there are a first coupling area 12 and a second coupling area 13.

According to the preferred embodiment of the invention, the fixing bracket 10 is equipped with an annular portion 14 which is removably coupled in correspondence with the first coupling area 12 of the aforementioned coupling seat 11, as seen in FIG. 5.

In fact, it is worth noting that, according to the present invention, the motor reduction unit 9 and the fixing bracket 10 are two distinct components that are removably coupled together.

Finally, according to the invention, the stator case 3 of the motor unit 2 is installed passing through the annular portion 14 of the fixing bracket 10 and is removably coupled in correspondence with the second coupling area 13 of the coupling seat 11, as shown in FIGS. 4a and 4b.

Also in this case, it is to be pointed out that, according to the present invention, the motorized unit 2, the motor reduction unit 9, and the fixing bracket 10 are three distinct components, removably coupled together.

According to the preferred embodiment of the invention, in particular, the coupling seat 11 is equipped, in correspondence with the first coupling area 12, with four centering and fixing seats 15, defined at distinct angular distances from each other.

According to different embodiments of the invention, the number of centering and fixing seats 15 may be different from four. In addition, these centering and fixing seats 15 may be arranged at identical angular distances along the aforementioned first coupling area 12.

According to the preferred embodiment of the invention, preferably but not necessarily, each of these centering and fixing seats 15 has a centering surface 16 defined along a coaxial circumference and of a different diameter, preferably smaller, than the circumference on which the first coupling area 12 is defined.

In the same way, the annular portion 14 of the fixing bracket 10 has, according to the preferred embodiment of the invention, four centering and fixing projections 17 protruding radially towards the inside of the same annular portion 14 and mutually spaced apart angularly according to the same angular distances of the four centering and fixing seats 15 of the coupling seat 11.

Also in this case, according to alternative embodiments of the invention, the number of such centering and fixing projections 17 can be different from four and/or their angular distances along this annular portion 14 can be identical, provided that, for any embodiment of the invention, the number of centering and fixing seats 15 of the coupling seat 11 and the number of centering and fixing projections 17 of the annular portion 14 of the fixing bracket 10 coincide with each other and are arranged in corresponding positions so that, as will be described below, when the fixing bracket 10 is coupled to the coupling seat 11, each of these centering and fixing projections 17 is housed in one of the aforementioned centering and fixing seats 15.

Figure 9:
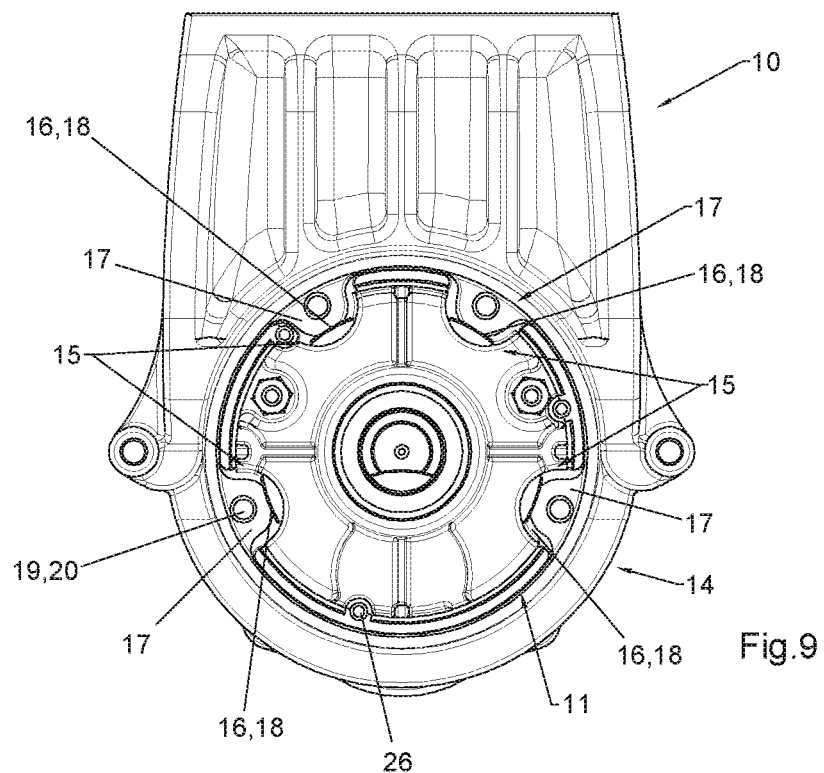
FIG. 9 shows a rear view of the motor reduction unit coupled to the fixing bracket of the motorized wheel of FIG. 2 without the motor unit.
Figure 10:
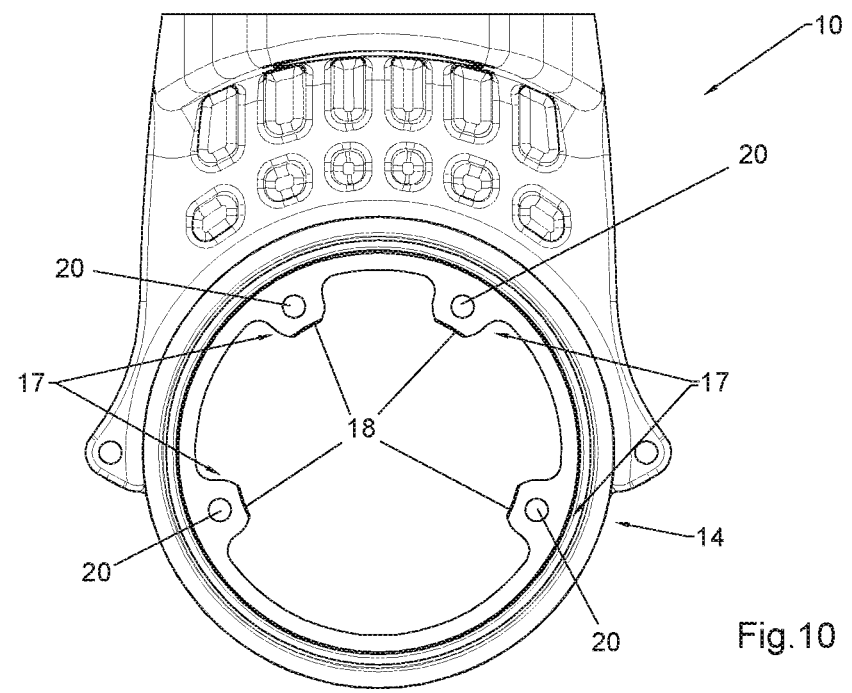
FIG. 10 shows a front view of the fixing bracket of the motorized wheel of FIG. 2 without the motor unit and the motor reduction unit.
Figure 11:
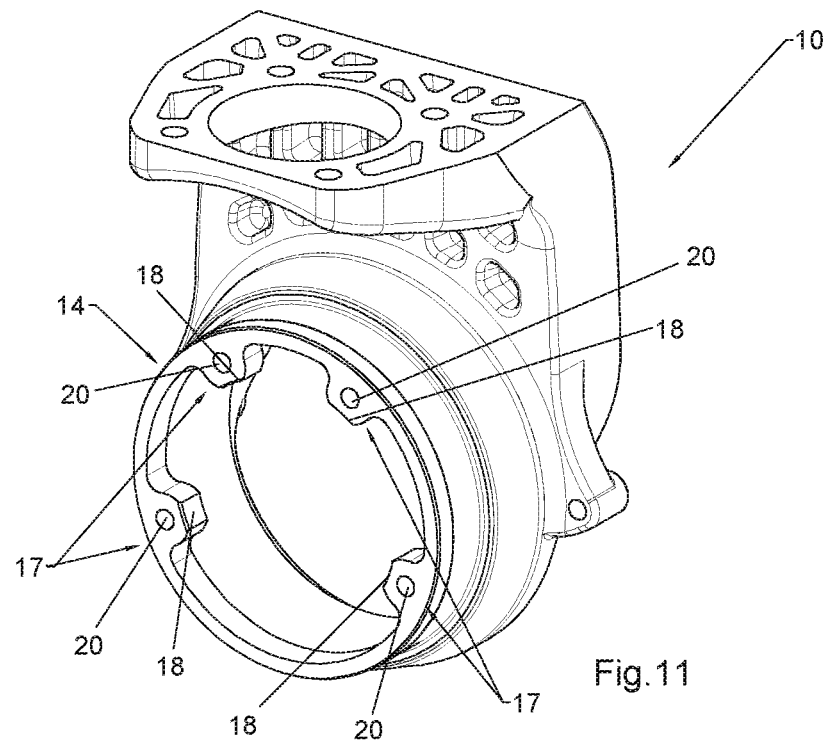
FIG. 11 shows an axonometric front view of the fixing bracket of the motorized wheel of FIG. 2 without the motor unit and the motor reduction unit.
Figure 12:
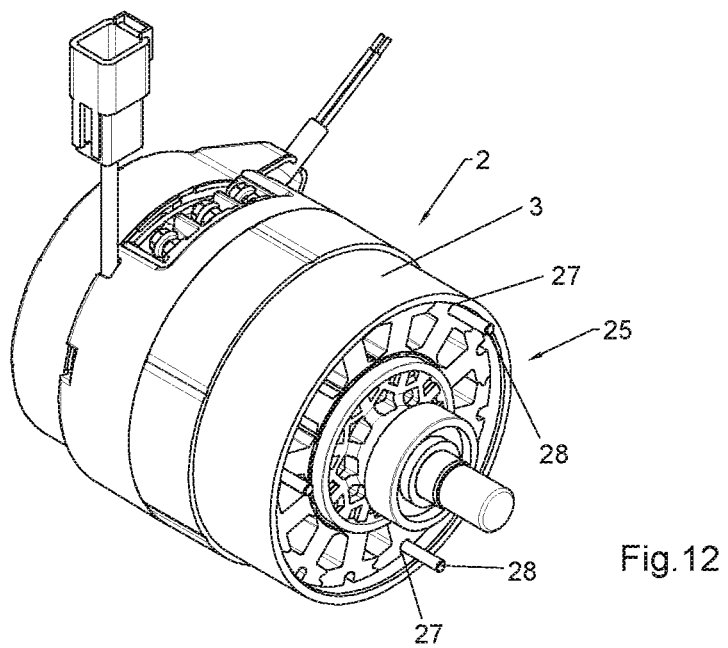
FIG. 12 shows an axonometric view of the motor unit of the motorized wheel of FIG. 2 without the motor reduction unit and the fixing bracket.
Figure 13:
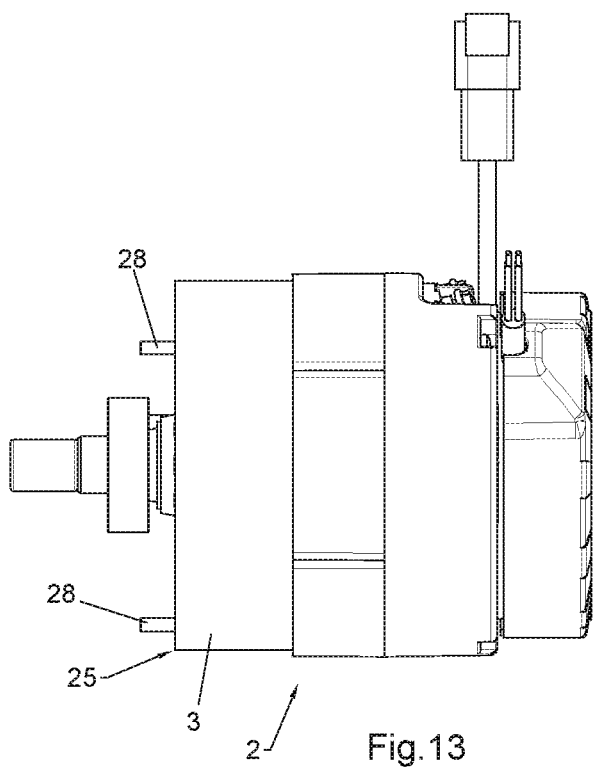
FIG. 13 shows a side view of the motor unit of the motorized wheel of FIG. 2 without the motor reduction unit and the fixing bracket.

Returning to the preferred embodiment of the invention, each of the centering and fixing projections 17, as can be seen in FIGS. 10 and 11, is equipped with a centering counter-surface 18 configured to rest against the centering surface 16 of one of the centering and fixing seats 15, specifically when the annular portion 14 of said fixing bracket 10 is coupled to the coupling seat 11 of said motor reduction unit 9, as shown in FIG. 9.

Advantageously, the definition of the centering surfaces 16 and of the relative centering counter-surfaces 18 facilitates a more accurate centering between the fixing bracket 10 and the motor reduction unit 9.

Furthermore, advantageously, the fact that the centering and fixing seats 15 and the centering and fixing projections 17 are defined respectively along the first coupling area 12 and along the annular portion 14 at different angular distances to each other, that is, with an asymmetrical configuration, results in only one possible coupling position between the coupling seat 11 and the annular portion 14, thus preventing assembly errors of the motorized wheel 1.

Furthermore, again according to the preferred embodiment of the invention, each of the centering and fixing seats 15 is equipped with a through-hole 19 and each of the centering and fixing projections 17 is equipped with a counter-hole 20, preferably threaded, so that the through-holes 19 and the counter-holes 20 are coaxial with each other in pairs when the annular portion 14 of the fixing bracket 10 is coupled to the coupling seat 11 of the motor reduction unit 9, in particular when each of the centering and fixing projections 17 is housed in one of the centering and fixing seats 15.

In order to secure the aforementioned coupling, the motorized wheel 1 has first fixing elements 21, preferably screws and bolts, inserted through each pair of through-holes 19 and counter-holes 20.

According to an alternative embodiment of the invention, the counter-holes 20 could also be unthreaded through-holes.

As regards the coupling of the motor reduction unit 9 and the motor unit 2 according to the preferred embodiment, this is achieved by defining, in correspondence with the second coupling area 13, in a central position, an annular centering seat 22 configured to house the rotation bearing 8 of the motor shaft 7.

Furthermore, in correspondence with the edge of the end, said second coupling area 13 provides for a shaped centering edge 23 in which there is an annular support surface 24, lowered with respect to the first coupling area 12. This annular support surface 24 is, in particular, configured to rest against a supporting counter-surface 25 defined in correspondence with the edge of the stator case 3, when the coupling seat 11 of the motor reduction unit 9 is coupled to the stator case 3 of the motor unit 2, as shown in FIGS. 4*a* and 4*b*.

Advantageously, the fact of directly coupling the coupling seat 11 of the casing 95 of the motor reduction unit 9 with the stator case 3, and therefore having the rotation bearing 8 directly coupled on the same seat 11, enables a more accurate coupling, less liable to give origin to mechanical clearance and misalignments between the motor reduction unit 9 and the motor unit 2.

Furthermore, advantageously, with the embodiment of the invention, the precision processes carried out to obtain the centering surface 16, the annular support surface 24, and the annular centering seat 22 can be carried out during the same machining operation, thus eliminating any error resulting from the repositioning of the piece for multiple machining operations.

In addition, still according to the preferred embodiment of the invention, the coupling seat 11 has a plurality of holes 26 defined in correspondence with the aforementioned second coupling area 13 and the stator case 3 comprises a plurality of counter-holes 27, so that the holes 26 and the counter-holes 27 are coaxial with each other in pairs when the stator case 3 of the motor unit 2 is coupled to the coupling seat 11 of the motor reduction unit 9.

To secure the aforementioned coupling, the motorized wheel 1 of the invention provides for second fixing elements 28, preferably screws and bolts, inserted through the holes 26 and counter-holes 27.

Operationally, to proceed with the assembly and the fastening of the components of the motorized wheel 1 of the invention, the following steps are envisaged.

First, said annular portion 14 of the fixing bracket 10 must be coupled to the coupling seat 11 in correspondence with the first coupling area 12.

In particular, according to the preferred embodiment of the motorized wheel 1 of the invention, this coupling operation provides for resting the centering surface 16 of each of the centering and fixing seats 15 against a respective centering counter-surface 18 of each of the centering and fixing projections 17, thereby also centering the fixing bracket 10 and the motor reduction unit 9.

The method of the invention then provides for securing the fixing bracket 10 to the coupling seat 11 of the motor reduction unit 9 by means of the aforesaid first fastening elements 21.

The method, only subsequently, provides for inserting the motor unit 2 through the annular portion 14 of the fixing bracket 10 and for coupling the stator case 3 in correspondence with the second coupling area 13 of the coupling seat 11 itself.

In particular, according to the preferred embodiment of the invention, this coupling operation involves centering the rotation bearing 8 of the motor shaft 7 in correspondence with the annular centering seat 22 and simultaneously centering the supporting counter-surface 25 of the edge of the stator case 3 in correspondence with the lowered annular support surface 24 of the shaped centering edge 23 of the coupling seat 11.

Finally, the method of the invention provides for securing the motor unit 2 on the coupling seat 11 of the motor reduction unit 9 by means of the aforementioned second fastening elements 28.

On the basis of the above, the motorized wheel 1 of the invention and the relative assembly and fixing method of said motorized wheel 1 achieve all the aforementioned objects.

In particular, the invention achieves the object of providing a motorized wheel able to maintain an utmost coupling precision between the motor reduction unit and the motor.

Consequently, it achieves the object of providing a motorized wheel that reduces the noise it generates during operation.

Furthermore, it reaches the object of providing a motorized wheel which minimizes the wear of its components, in particular of the motor reduction unit components.

It also achieves the object of providing a motorized wheel which requires a reduced number of processes with respect to those required by motorized wheels of the prior art.

Finally, the object of providing a motorized wheel which eliminates those processes that could lead to the damage of the most delicate parts of the motorized wheel itself is also achieved.

The invention claimed is:

1. A motorized wheel structure comprising:
   a motor unit equipped with a stator case in which a stator and a rotor equipped with a motor shaft are inserted, said motor unit being suited to set a wheel rotating;
   a motor reduction unit operatively connected to said motor shaft of said motor unit; and
   a fixing bracket for fastening said motorized wheel structure to an external device;
   wherein:
   said motor reduction unit is equipped at one end with a substantially circular coupling seat in which a first coupling area and a second coupling area are defined;
   said fixing bracket is equipped with an annular portion removably coupled in correspondence with said first coupling area of said coupling seat;
   said stator case is installed passing through said annular portion of said fixing bracket and is removably coupled in correspondence with said second coupling area of said coupling seat.

2. The motorized wheel structure according to claim 1, wherein:
   said coupling seat is equipped, along said first coupling area, with at least two centering and fixing seats, each of said centering and fixing seats providing for a centering surface defined along a coaxial circumference and with a different diameter than a circumference on which said first coupling area is defined; and
   said annular portion has a number of centering and fixing projections equal to the number of said centering and fixing seats, said centering and fixing projections protruding radially towards an inside of said annular portion, each of said centering and fixing projections equipped with a centering counter-surface configured to rest against said centering surfaces of one of said centering and fixing seats when said annular portion of said fixing bracket is coupled to said coupling seat of said motor reduction unit.

3. The motorized wheel structure according to claim 2, wherein each of said centering and fixing seats is equipped with a through-hole and each of said centering and fixing projections is equipped with a counter-hole so that said through-holes and said counter-holes are coaxial with each other in pairs when said annular portion of said fixing bracket is coupled to said coupling seat of said motor reduction unit, said motorized wheel structure providing for first fixing elements.

4. The motorized wheel structure according to claim 3, wherein said coupling seat, in correspondence with said second coupling area, has:
   an annular centering seat defined in a central position and configured to house a rotation bearing of said motor shaft; and
   a shaped centering edge in which there is an annular support surface lowered with respect to said first coupling area, said annular support surface configured to rest against a supporting counter-surface defined in correspondence with an edge of said stator case, when said coupling seat of said motor reduction unit is coupled to said stator case of said motor unit.

5. A method for fixing components of the motorized wheel structure according to claim 4, the method comprising the following steps:
   coupling said annular portion of said fixing bracket in correspondence with the first coupling area of said coupling seat;
   fastening said fixing bracket to said coupling seat of said motor reduction unit by means of said first fixing elements;
   inserting said motor unit through said annular portion of said fixing bracket and coupling said stator case in correspondence with said second coupling area of said coupling seat; and
   fixing said motor unit on said coupling seat of said motor reduction unit.

6. The method according to claim 5, wherein said coupling operation of said annular portion of said fixing bracket in correspondence with said first coupling area of said coupling seat provides for resting said centering surface of each of said seats against a corresponding centering counter-surface of each of said centering and fixing projections.

7. The method according to claim 5, wherein said coupling operation of said stator case in correspondence with the second coupling area of said coupling seat provides for:
   centering said rotation bearing of said motor shaft in correspondence with said annular centering seat; and
   centering said supporting counter-surface of said edge of said stator case in correspondence with said lowered annular support surface of said shaped centering edge of said coupling seat.

8. The motorized wheel structure according to claim 1, wherein:
   said coupling seat has a plurality of holes defined in correspondence with said second coupling area; and
   said stator case comprises a plurality of counter-holes, so that said holes and said counter-holes are coaxial with each other in pairs when said stator case of said motor unit is coupled to said coupling seat of said motor reduction unit, said motorized wheel structure providing for second fixing elements.

9. The motorized wheel structure according to claim 1, wherein said stator case comprises a cylinder made of metal material.

* * * * *